L. ERPELDING.
Reaping and Mowing Machine.
No. 33,416.
Patented Oct. 1, 1861.
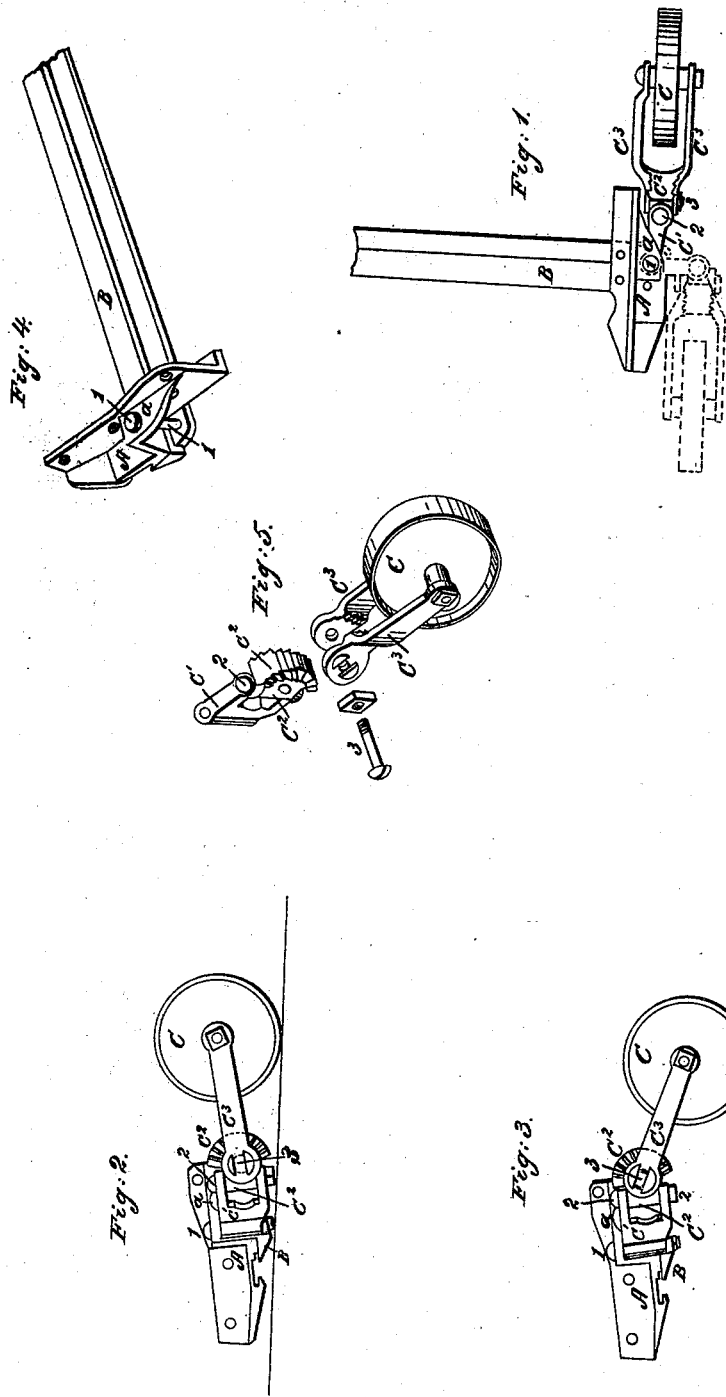

UNITED STATES PATENT OFFICE.

LAMBERT ERPELDING, OF CHICAGO, ILLINOIS, ASSIGNOR TO CYRUS H. McCORMICK, OF SAME PLACE.

IMPROVEMENT IN REAPING AND MOWING MACHINES.

Specification forming part of Letters Patent No. 33,416, dated October 1, 1861.

*To all whom it may concern:*

Be it known that I, LAMBERT ERPELDING, of Chicago, in the county of Cook and State of Illinois, have invented certain new and useful Improvements in Machines for Reaping and Mowing, of which the following is a full, clear, and exact description, reference being had to the accompanying drawings, which make a part of this specification, and in which—

Figure 1 represents a top view of a caster-wheel in two positions—one shown in continuous lines, the other in dotted lines—for supporting the grain side of a reaper or mower, the cast-metal angle-iron and socket for supporting and uniting the caster-wheel, the outer end of the finger-beam and cutter, the divider, and the beam which carries the outer end of the platform and the reel-bearer. Fig. 2 represents a side elevation of the same parts, with the elbow of the arm of the caster-wheel flexed so as to lower the cutting apparatus to the ground, to adapt the machine to mowing. Fig. 3 represents a like view of the same parts, but with the arm of the caster-wheel flexed in the opposite direction, to carry the cutting apparatus above the surface of the ground, to adapt the machine to reaping. Fig. 4 represents a view in perspective of the same parts, with the caster-wheel and its flexible arm removed. Fig. 5 represents a view in perspective of the caster-wheel, and of its flexible arm unjointed.

My improvement consists in making an arm by which the caster-wheel is attached to the grain side of the machine with a horizontal adjustable joint, to facilitate the raising and lowering of the cutting apparatus, and a free vertical joint, to facilitate the turning of the machine, so that by increasing or diminishing the flexure of the arm the height of the grain side of the machine and the corresponding end of the cutting apparatus may be allowed to rest on or be set at different heights above the ground, while the free joint allows the wheel to run tangent to any curve in which the machine may be turned.

The several members of the outer or grain side of the machine meet in and are united to a cast-iron socket-piece, A, which also forms the shoe or under side of the divider, to run on the ground in mowing. To the lower part of this socket-piece the finger-beam B is attached, and immediately above the finger-beam, on the outer side of the socket-piece, a bracket, $a$, is formed, which, in connection with the outer end of the finger-beam, supports a vertical joint-pin, 1, Fig. 4, on which an arm composed of three parts, $c'$ $c^2$ $c^3$, is hinged at its inner end, while its outer end is jointed to the axle of the caster-wheel C.

At the outer end of the arm $c'$ a second vertical joint, 2, is formed, to unite the parts $c'$ and $c^2$ of the arm, and to allow the caster-wheel to turn round ninety degrees of a circle, as shown in dotted lines in Fig. 1, to permit the wheel to run in the tangent of the curve in which the machine is moving, while its outer end is backing round. In this way the binding of the wheel and its digging into the ground are avoided, saving both the draft of the horses and the straining of the machine, which results from a want of freedom of the arm of the caster to turn freely in whatever direction the machine is moved. If the outer of the two vertical joints were not there, and the arm could only turn on the joint 1, either that joint would have to be set out permanently in the position which the joint 2 occupies, as shown in dotted lines in Fig. 1, or else the wheel could not follow freely the movements of the machine when its outer side moved backward; but if the joint 2 were set out, the caster-wheel, when the machine moved forward in a swath, would overrun the standing grain or grass; hence to set it out so far is inadmissible. The two vertical joints 1 and 2 allow the wheel to run out clear of the divider, and to follow freely the path of the machine when moved backward, and also cause the wheel to run inside of the standing grain or grass when the machine moves forward in cutting in the harvest-field. The part $c^2$ of the arm is united to the part $c'$ by a free vertical joint, 2, as described; but it is united to the part $c^3$ of the arm by a horizontal adjustable joint, 3. The part $c^3$ of the arm is made in two parts—one on each side of the wheel—and having its front end fitted with a bearing for the axle of the wheel, while the inner ends of these two parts are arranged to embrace the outer end of the part of the arm $c^2$, and the joint-bolt 3 is passed through all three, and the bolt being fitted with a head at one end and a screw and nut at the other end, the three parts can be clamped firmly together by it.

To insure the rigidity of the joint when clamped without straining the screw on the joint-pin, the adjacent surfaces of the three parts of the arm encircling the joint-pin are fitted with symmetrical radial grooves which interlock and fit each other in any position into which the parts can be moved for the purpose of adjustment. The flexing of this joint downward lowers the cutting apparatus to the ground, as shown in Fig. 2, to adapt the machine to mowing, while the flexing of the joint upward and clamping it there, as shown in Fig. 3, raises the cutting apparatus above the ground, to adapt the cutter for reaping.

The wheel C is firmly supported on its axle between the outer ends of the portions of the outer part, $c^3$, of the arm.

What I claim as my invention is—

The combination of a caster-wheel and an arm having a free joint and an adjustable elbow for supporting the grain side of reaping or mowing machines, substantially as described.

In testimony whereof I have hereunto subscribed my name.

LAMBERT ERPELDING.

Witnesses:
 WM. S. McCORMICK,
 JAMES T. GRIFFIN.